United States Patent
Villalon

(10) Patent No.: US 12,400,400 B2
(45) Date of Patent: *Aug. 26, 2025

(54) TECHNIQUES FOR PRODUCING THREE-DIMENSIONAL MODELS FROM ONE OR MORE TWO-DIMENSIONAL IMAGES

(71) Applicant: HL Acquisition, Inc., Cambridge, MA (US)

(72) Inventor: Rachelle Villalon, Cambridge, MA (US)

(73) Assignee: HL Acquisition, Inc., Cambridge, MA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/882,694

(22) Filed: Aug. 8, 2022

(65) Prior Publication Data
US 2022/0392165 A1 Dec. 8, 2022

Related U.S. Application Data

(63) Continuation of application No. 16/423,257, filed on May 28, 2019, now Pat. No. 11,423,615.

(Continued)

(51) Int. Cl.
*G06T 19/00* (2011.01)
*G06F 3/01* (2006.01)
*G06F 17/16* (2006.01)
*G06N 3/047* (2023.01)
*G06T 3/4046* (2024.01)

(Continued)

(52) U.S. Cl.
CPC .............. *G06T 17/20* (2013.01); *G06F 17/16* (2013.01); *G06N 3/047* (2023.01); *G06T 3/4046* (2013.01);

(Continued)

(58) Field of Classification Search
CPC .................. G06T 17/20; G06T 15/205; G06T 2207/10028; G06T 2207/20084; G06F 17/16; G06N 3/0472
See application file for complete search history.

(56) References Cited

U.S. PATENT DOCUMENTS

| | | | |
|---|---|---|---|
| 2007/0088531 A1* | 4/2007 | Yuan ...................... | G06T 17/20 703/2 |
| 2012/0299920 A1* | 11/2012 | Coombe ................ | G06T 19/00 345/423 |

(Continued)

OTHER PUBLICATIONS

Eigen, Depth Map Prediction from a Single Image using a Multi-Scale Deep Network, Dept. of Computer Science, Courant Institute, New York University, pp. 9 (Year: 2014).*

(Continued)

*Primary Examiner* — Phuc N Doan
(74) *Attorney, Agent, or Firm* — Fish & Richardson P.C.

(57) ABSTRACT

Described are techniques for producing a three-dimensional model of a scene from one or more two dimensional images. The techniques include receiving by a computing device one or more two dimensional digital images of a scene, the image including plural pixels, applying the received image data to scene generator/scene understanding engine that produces from the one or more digital images a metadata output that includes depth prediction data for at least some of the plural pixels in the two dimensional image and that produces metadata for a controlling a three-dimensional computer model engine, and outputting the metadata to a three-dimensional computer model engine to produce a three-dimensional digital computer model of the scene depicted in the two dimensional image.

29 Claims, 18 Drawing Sheets

Related U.S. Application Data

(60) Provisional application No. 62/677,219, filed on May 29, 2018.

(51) Int. Cl.
| | | |
|---|---|---|
| *G06T 7/11* | (2017.01) | |
| *G06T 7/187* | (2017.01) | |
| *G06T 7/194* | (2017.01) | |
| *G06T 7/50* | (2017.01) | |
| *G06T 7/70* | (2017.01) | |
| *G06T 15/20* | (2011.01) | |
| *G06T 17/20* | (2006.01) | |
| *G06T 19/20* | (2011.01) | |
| *G06V 10/22* | (2022.01) | |
| *G06V 10/74* | (2022.01) | |
| *G06V 10/77* | (2022.01) | |
| *G06V 20/70* | (2022.01) | |

(52) U.S. Cl.
CPC ............... *G06T 7/11* (2017.01); *G06T 7/187* (2017.01); *G06T 7/50* (2017.01); *G06T 7/70* (2017.01); *G06T 15/205* (2013.01); *G06V 10/225* (2022.01); *G06V 10/761* (2022.01); *G06V 10/7715* (2022.01); *G06V 20/70* (2022.01); *G06T 2200/08* (2013.01); *G06T 2207/10028* (2013.01); *G06T 2207/20084* (2013.01); *G06T 2210/12* (2013.01); *G06T 2215/16* (2013.01); *G06V 2201/10* (2022.01)

(56) References Cited

U.S. PATENT DOCUMENTS

2018/0082435 A1* 3/2018 Whelan .................. G06T 7/579
2021/0209855 A1* 7/2021 Stokking ................. G06T 7/50

OTHER PUBLICATIONS

Liu, Deep Convolutional Neural Fields for Depth Estimation from a Single Image, URL: https://www.arxiv-vanity.com/papers/1411.6387/ , pp. 13 (Year: 2014).*

Sousa, Convolutional Neural Networks for Depth Estimation on 2D Images, 2015, pp. 6 (Year: 2015).*

* cited by examiner

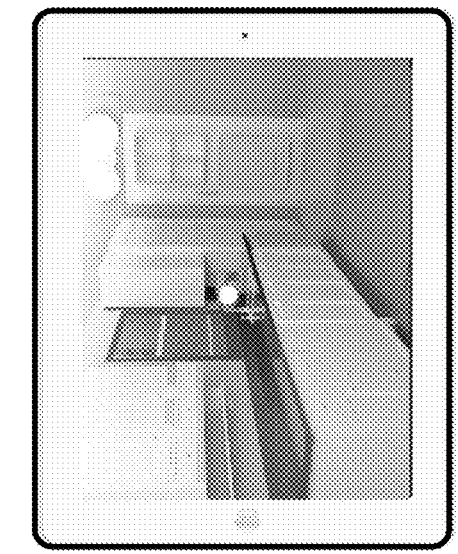
FIG. 13A
FIG. 13B
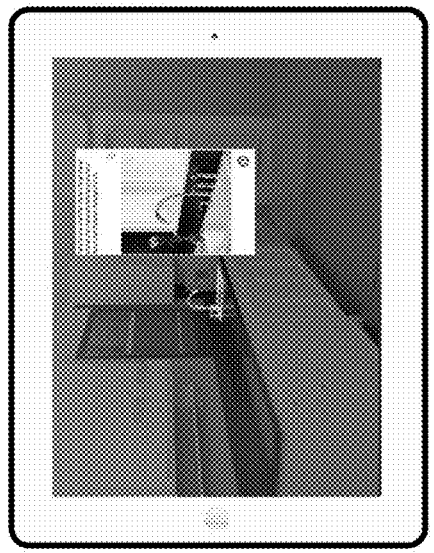
FIG. 13C
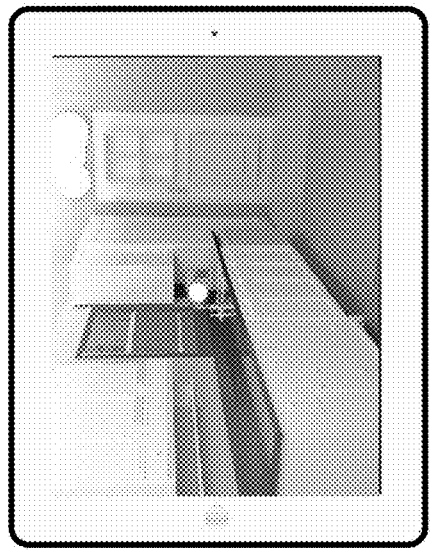
FIG. 13D

TECHNIQUES FOR PRODUCING THREE-DIMENSIONAL MODELS FROM ONE OR MORE TWO-DIMENSIONAL IMAGES

CLAIM OF PRIORITY

This application claims priority under 35 U.S.C. § 119(e) to provisional U.S. Patent Application 62/677,219, filed on May 29, 2018, entitled: "Techniques for Producing Three-Dimensional Models from a Single, Two-Dimensional Image," the entire contents of which are hereby incorporated by reference.

BACKGROUND

This description relates to 'built' environments and more particularly to representation of locations of items in 'built' environments.

Recent advances in video and depth sensor technologies have been used to process sensor data into 3D maps that represent structure of a "built environment." Such 3D maps can be used in various applications. Building information modelling (BIM) involves producing digital representations of physical and functional characteristics of such environments that are represented in BIM data. Building information modelling often assumes the availability of the location of the devices (assets) as part of the BIM data. Such technological developments are often used in commercial applications for various purposes, such as in developing "as built" documentation.

SUMMARY

This application claims priority to the above mentioned provisional U.S. Patent Application 62/677,219 ('219 application), filed on May 29, 2018, the entire contents of which are hereby incorporated by reference. In the event of disagreement between the subject matter of the '219 application and the present application, the contents of the present application shall control.

According to an aspect, a method includes receiving by a computing device one or more two dimensional digital images of a scene, the image including plural pixels, applying the received image data to scene generator/scene understanding engine that produces from the one or more digital images a metadata output that includes depth prediction data for at least some of the plural pixels in the two dimensional image and that produces metadata for a controlling a three-dimensional computer model engine, and outputting the metadata to a three-dimensional computer model engine to produce a three-dimensional digital computer model of the scene depicted in the two dimensional image.

The above aspect may include amongst other features one or more of the following features:

The method wherein receiving further includes receiving the one or more images and reference measurements associated with the one or more images. The method wherein applying the received image to the scene generator engine/scene understanding service, further comprises the scene generator engine/scene understanding service identifying objects within the image scene; and applying labels to the identified objects. The method wherein identifying objects further includes extracting each labeled object's region and determining and outputting pixel corner coordinates, height and width and confidence values into metadata output to provide specific instructions for a 3D modeling engine to produce the 3D model. The method further includes generating with the metadata statistical information on the identified objects within the image scene.

The method further includes inferring depths of pixels in the image. The method wherein inferring depths of pixels in the image includes transforming the input image by a superpixel segmentation that combines small homogenous regions of pixels into superpixels that are homogenous regions of pixels that combined to function as a single input. The method wherein inferring depths of pixels in the image further includes determining a penalty function for superpixels by determining unary values over each of the superpixels, determining pairwise values over each of the superpixels and determining a combination of the unary and the pairwise values.

The method wherein the unary processing returns a depth value for a single superpixel and the pairwise communicates with neighboring superpixels having similar appearance to produce similar depths for those neighboring superpixels. The method wherein the unary processing for a single superpixel is determined by inputting the single superpixel into a fully convolutional neural net that produces a convolutional map that has been up-sampled to the original image size, applying the up-sampled convolutional map and the superpixel segmentation over the original input image to a superpixel average pooling layer to produce feature vectors; and input the feature vectors to a fully connected output layer to produce a unary output for the superpixel.

The method wherein the pairwise processing for a single superpixel is determined by collecting similar feature vectors are collected from all neighboring superpixel patches adjacent to the single superpixel, cataloguing unique feature vectors of the superpixel and neighboring superpixel patches into collections of similar and unique features, and input the collections into a fully connected layer that outputs a vector of similarities between the neighboring superpixel patches and the single superpixel. The method wherein the unary output is fed into the conditional random fields graph model to produce an output depth map that contains information relating to the distance of surfaces of scene objects from a reference point. The method wherein the depth prediction engine processes input digital pixel data through a pre-trained convolutional neural network to produce a depth map.

According to an aspect, a method includes producing by one or more computer systems a spatial depth prediction of pixels in an image by transforming pixels in an image into a segmented representation, by applying small homogenous regions of pixels to a segmentation of the image to produce superpixel representations of the homogenous regions and processing the segmented representation by determining a pairwise of energy potentials and unary energy potentials to produce a depth map.

The method wherein pairwise potential processing includes matching neighboring super pixels, calculating differences of feature vectors, calculating a fully connected output layer, calculating a conditional random fields graph model loss layer, and producing an output depth map for the input image. The method wherein the unary energy potential processing includes calculating a superpixel segmentation from a super pixel map and an output from a convolutional map of up-sampling data, calculating a superpixel average pool, calculating a fully connected output layer and producing an output depth map for the input image.

According to an aspect, a computer implemented method of producing a three dimensional computer model shell includes producing metadata that instruct a three dimensional modelling engine to produce a spatial shell and to place objects within the spatial shell, with placed objects being placeholders that are swapped for other objects, producing the shell process by producing a scaffold mesh, producing a bounding box, producing a clean final mesh; and producing the three dimensional modelling shell.

The method wherein object placement includes calculating the original coordinate position of bounding boxes, transforming object positions and orientations based on original coordinates, placing the objects into the three dimensional computer model shell.

Other aspects include systems, devices, tablets, smartphones, and/or computer program products embodying computer executable instructions on a non-transitory computer readable medium or media that function according to one or more of the above aspects. Other aspects are disclosed in the detailed description.

One or more aspects include techniques for producing a three-dimensional model of a scene from one or more two dimensional images. The techniques include converting one (or one or more) digital images into a 3-dimensional computer model by receiving by one or more image data translation systems digital image source data, applying the received image data to scene generator engine/scene understanding service, and returning a 3-dimensional digital computer model. A potential use of such technology is in residential remodeling. However, for the most part such technology is either too expensive or too complicated for relatively small contractors to use. Other uses exist including in other built in or as built programs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 13-13D shows exemplary, envisioned outputs using processing of FIGS. 1-12.

DETAILED DESCRIPTION

Described are systems, methods, and computer program products to generate three-dimensional ('3D') models from 'as built' environments as captured on a single image or in some embodiments from plural images. The images used are two dimensional images that capture three-dimensional ('3D') 'as built' environments.

Figure 1:
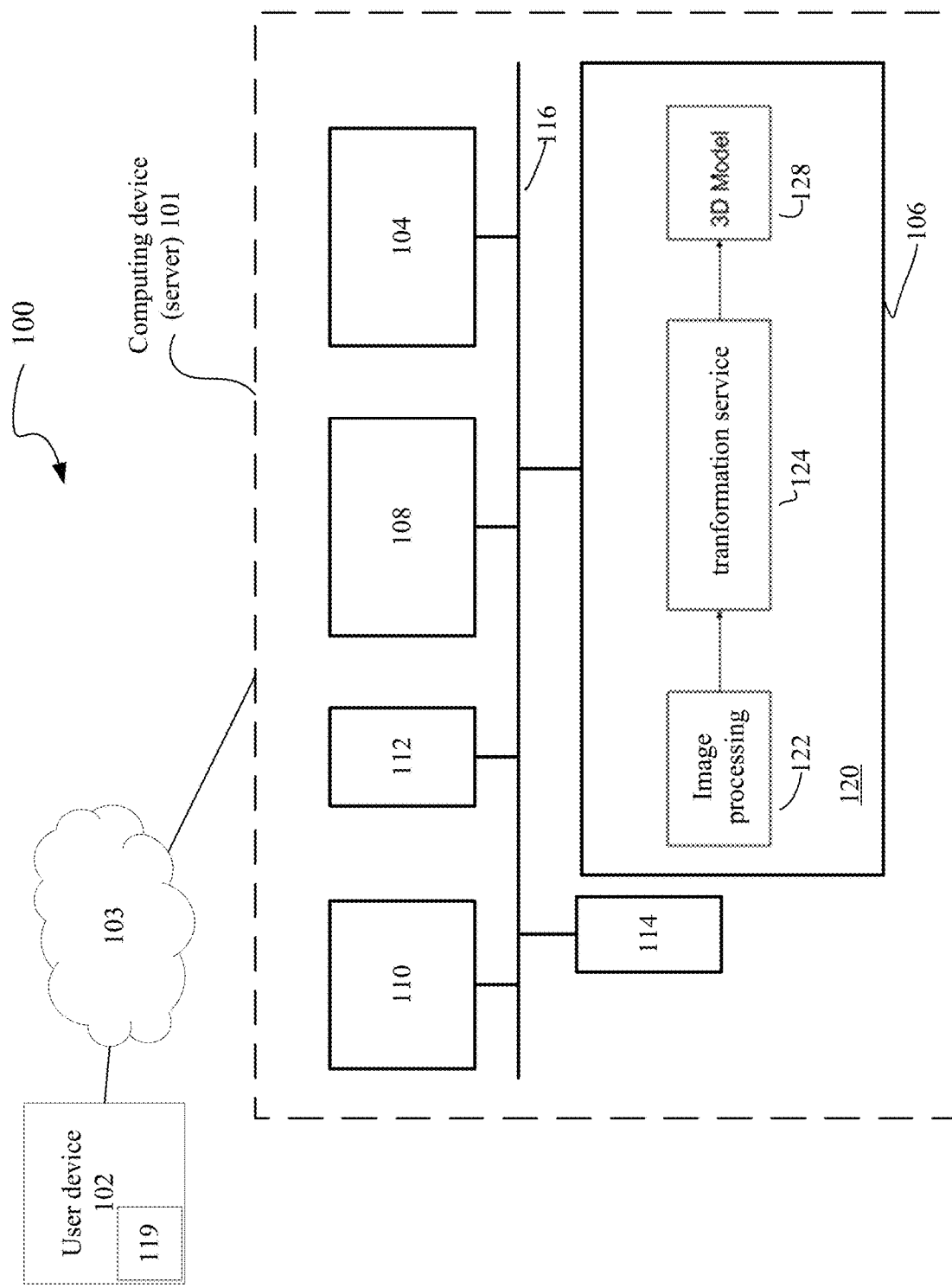
FIG. 1 is a block diagram of a system for generating three-dimensional ("3D") models from one or more two dimensional images.

Referring to FIG. 1, illustrates a typical system 100 is shown. The system 100 includes computing devices 101 and 102 that communicate via a network, e.g., the Internet. In some embodiments, the computing device 101 is a server accessible by a user (client) device 102 over a network 103. In other embodiments the client device 102 includes the functional features executed by the server.

The server 101 (or the client device 102 in the other embodiments) has the following capabilities, the capability to receive/take images (pictures); the capability of processing image data and the capability to execute other processes that will be discussed below. Examples of devices that satisfy these minimal capabilities include computers (portable or desktop); tablet computer devices, smartphones, and personal digital assistant devices.

In the discussion below, the computing device 101 is a server computer 101 and the user device 102 communicates with the server computer 101. The description below will focus on a smartphone as the user device 102, however it is understood that this is but one non-limiting example. The term "smartphone" is used to describe a mobile phone device that executes an advanced mobile operating system. The smartphone has hardware and a mobile operating system with features of personal computer hardware and operating systems along with features required for mobile or handheld operation, such as those functions needed for use of the smartphone as a cell phone and includes GPS (global position system) navigation. The smartphone executes applications (apps) such as a media player, as well as browsers, and other apps. Smartphones typically can access the Internet and have a touchscreen user interface.

The computing device 101, i.e., server computer 101, includes one or more processors 104, memory 106 coupled to the one or more processors, and storage 108. The system 100 may include a display 110, user interfaces 112 to, e.g., keypads, etc. 112 and I/O interfaces 114, to e.g., ports, etc., all coupled via a bus 116.

In memory 106, a server process 120 translates a 2D image into a 3D model. Process 120 includes an image processing 122 module that receives an input image from e.g., a camera of the device 100 or from a storage device and pre-processes the image for use with a scene generator engine/machine learning service, i.e., a transformation service 124 that includes functions, as discussed below. The transformation service 124 upon processing of the image returns metadata (not shown) that are provided to a 3D modelling engine 128 to produce an 3D model output. Typically, the transformation service 124 is a server side process. The user device 102 includes image capture and upload client side processes 119.

Figure 2:
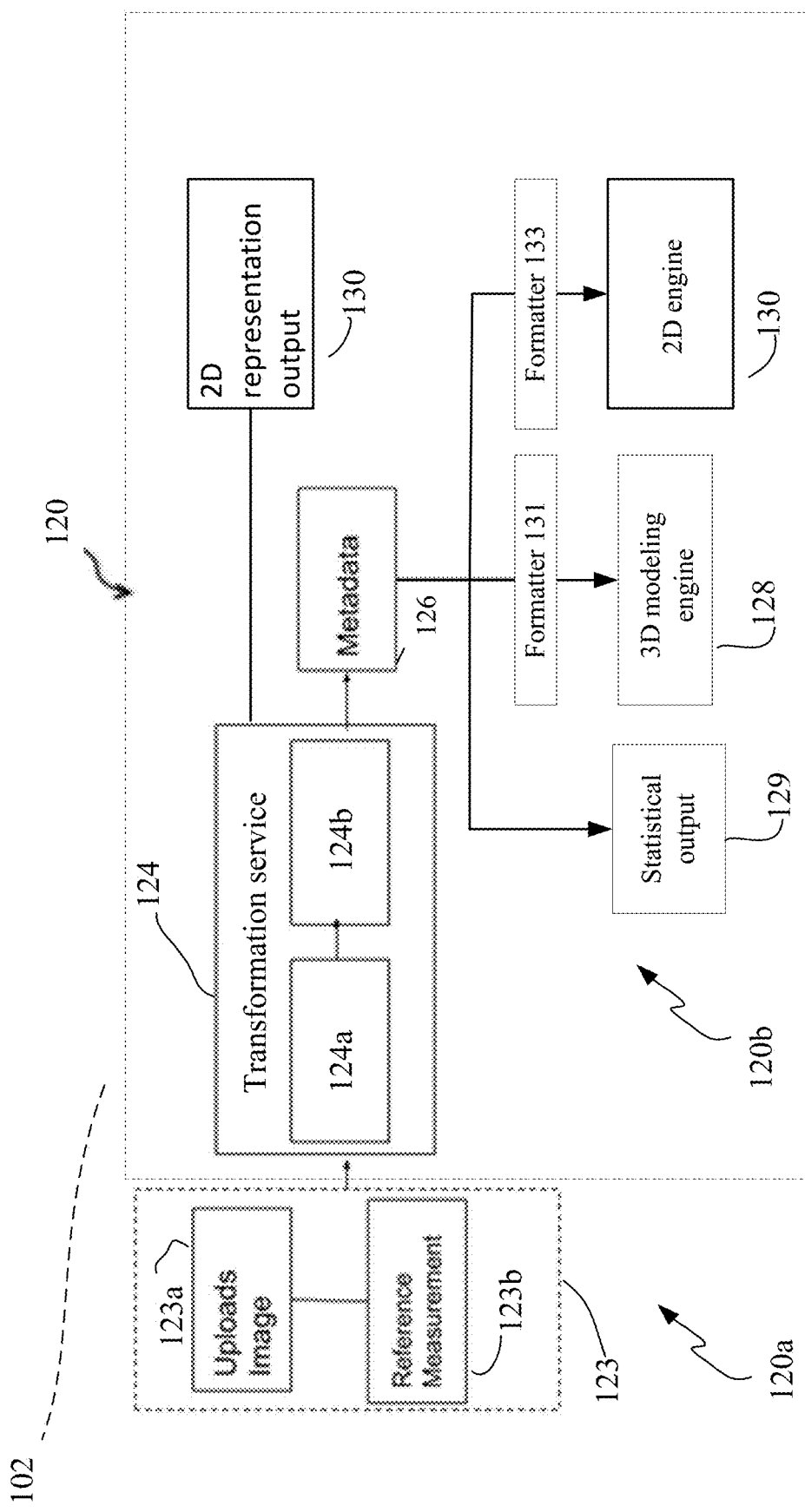
FIG. 2 is a diagram for translating one or more images into a scaled 3D model.

Referring now to FIG. 2, the process 120 executes to translate one or more uploaded images having reference measurements into a scaled 3D model and/or 2D representation output. A user with a user device 102 executes a client side process 120a that uploads an image 123a with reference measurement data 123b. The reference measurement data can be provided in a number of ways.

For example, the reference measurement data can be provided as an input by the user as a client side process 120a (i.e., the user provides reference measurements of the height and width of a door in the image). Alternatively, the reference measurement data can be provided as a server side process 120b by a scene understanding service 124a that recognizes a door, refrigerator or any other item in the image, and that accesses a database (not shown) of dimensional specifications pertaining to the recognized item. The database can be provided by a data source, e.g., on the Internet, etc.

The uploaded image 123a with reference measurement(s) 123b are input to the transformation service 124. The transformation service 124 includes the scene understanding service 124a and a depth prediction service 124b that produce metadata 126 for input into a 3D modeling engine 128 to produce a 3D model output, and/or to a 2D representation engine 130 to produce a 2D representation output, such as an image, floor plan, elevation, and/or section views. Using the metadata 126, the 3D modelling engine 128 can output from the translation service 124. Typically, the metadata 126 will be in a format corresponding to a format used by the 3D modeling engine 128. Any commercially available 3D modeling engine could be used with the format of the metadata compliant with the format of instructions for the particular available 3D modeling engine that is used.

The metadata output 126 are first fed to or call Application Programing Interfaces for the particular 3D modeling engine 128 or the 2D engine 130. The API will use the calculated metadata as input to configure the particular 3D modeling engine 128 or the 2D engine 130 to produce a 3D model or a 2D representation.

Alternatively the metadata are fed to a formatter 131 or a formatter 133 that format the data into input or 'instructions' (not shown) that can directly inputted to control the 3D modeling engine 128 or the 2D engine 130. Formatters 131 and 133 can be part of the process 120 (as shown) or can be a separate process or can be part of the 3D modeling engine 128 or the 2D engine 130. The exact nature of the formatters 131 and 133 would depend on specific requirements of the 3D modeling engine 128 and/or the 2D engine 130.

The metadata produced by process 120 is descriptive/numerical, material whereas the instructions or "metadata instruction" or the API are procedural, prescriptive. The metadata are descriptive or numerical 'data' that is used subsequently within procedural operations, but may not inherently specify procedure. For example, a 3D object shape can be defined by metadata as vectors or as pixels, but the metadata does not specify how the metadata will be used to render the shape.

In some implementations, rather than or in addition to producing metadata for conversion by the modeling engine into the 3D model, the process 102a can produce a numerical output description from the metadata. The metadata can be analyzed to produce numerical outputs, e.g., statistical data 129, for uses in applications such as statistical analysis from of visual input data, such as images. One example is to identify a population density of people and objects in a room and their relative relationship amongst each other. The movement of people and/or objects can help to identify and to predict how a built space will and can be occupied based on previous information captured by the machine learning service 120.

Figure 3:
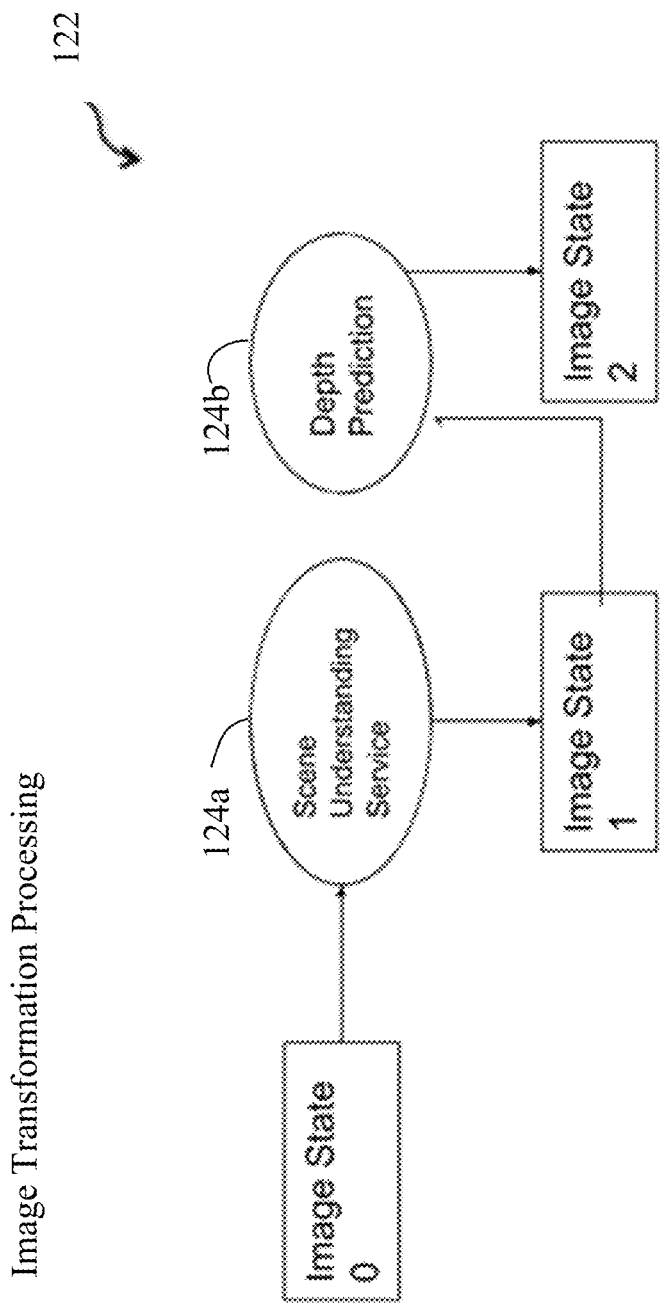
FIG. 3 is a flow diagram for image transformation processing.

Referring now to FIG. 3, the image processing 122 (FIG. 2) produces an image that contains embedded data transferred from the scene understanding service 124a and the depth prediction service 124b, which data are used for 3D mapping with three image transformation states. Initially, the image is at a "State 0," the original state of the image as provided from user input (see FIG. 2). The image is processed by the scene understanding service 124a that outputs the image in an image State 1, i.e., identification of objects recognized in a scene from the original image. Image State 1 has the image with metadata (recognized objects and location data) that are embedded with the image or that can be uploaded to the server 101 (FIG. 1) or a database (not shown). The image in image State 1 serves as an input to depth prediction service 124b that outputs the processed image in the image State 2. Image State 2 has the image with metadata (recognized objects and location data, and depth of pixel data) that are embedded with the image or that can be uploaded to the server 101 (FIG. 1) or the database (not shown).

Figure 4:
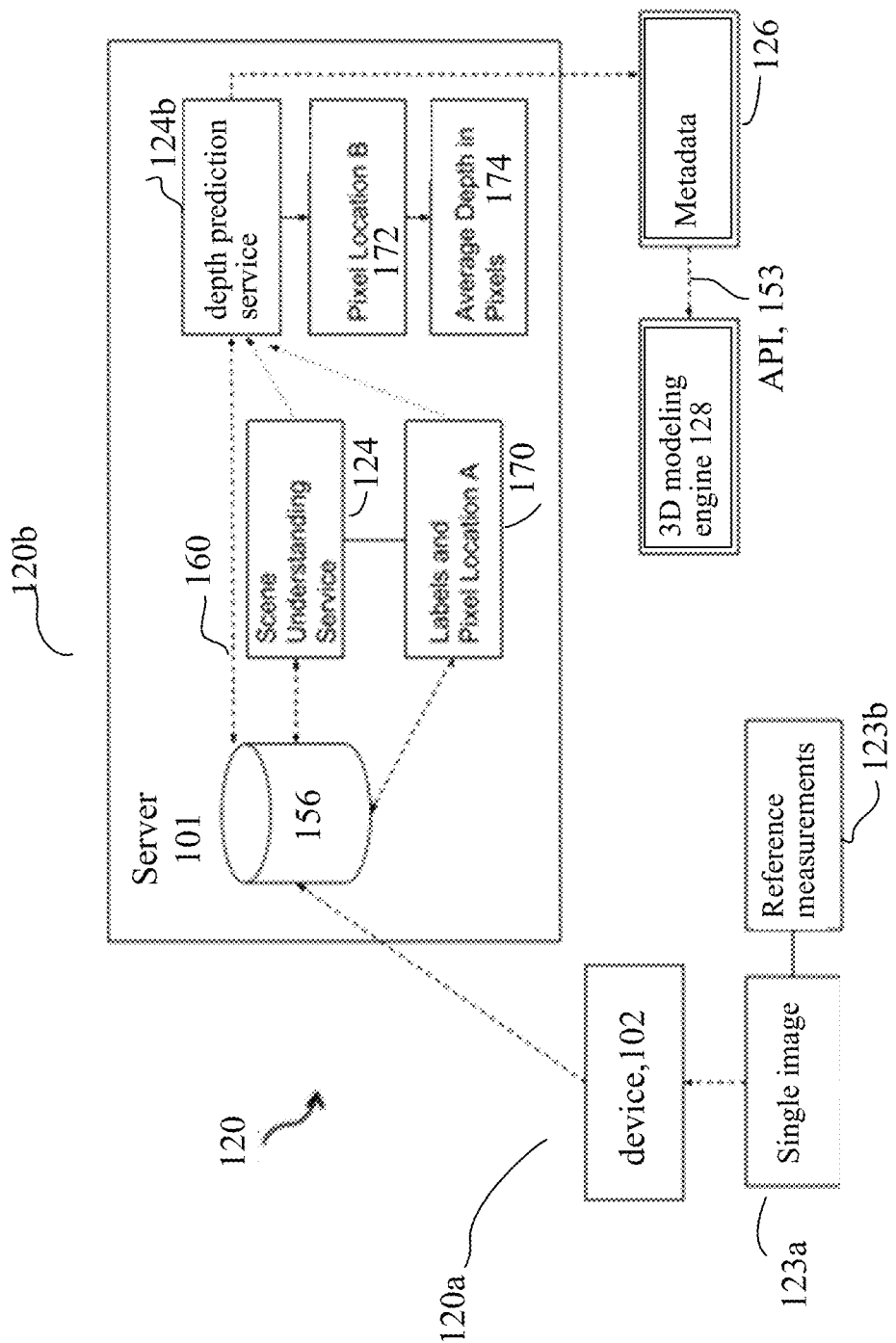
FIG. 4 is a block diagram of a service for producing a metadata output.

Referring now to FIG. 4, client side processing 120a of the process 120 is shown in communication with server side processing 120b that executes on a server 101 to produce the metadata 126 that is used as an input into a 3D geometry engine 154 by way of an application programming interface "API" 153 (alternatively, an appropriate formatter 131 (FIG. 2) could be used).

The server side processing 120b receives the user uploaded image(s) 123a with reference measurement(s) 123b. The image 123a is sent to server 102 and saved in a database 156. The image in its original state, State 0 (FIG. 3) in the database 156 is passed to the transformation service 124 where labels and pixel location data are determined and saved and passed as fields to a database entry along with the image in State 1 (FIG. 3) to the database 156. The depth prediction service 124b queries the database 156 through an API 160 for entries posted by the scene understanding service 124a. The server 102 returns the database entries (including fields and properties) modified by the scene understanding service from State 1 FIG. 3 and uses the pixel location A 170 and label data derived by the transformation service 124 as input to the depth prediction service 124b.

The Pixel Location A is input to the depth prediction service 124b to enable the depth prediction service 124b to determine a pixel window or pixel location B 172 and calculate an average depth in pixels 174. The resulting metadata 126 from the depth prediction service 124b is posted to the database 156. The server 102 queries for all the processed results derived from undergoing process 120 to produce a file, accompanying the metadata 126, which serves as 'instructions' to configure the 3D modeling engine 128 (see FIG. 9).

Figure 5:
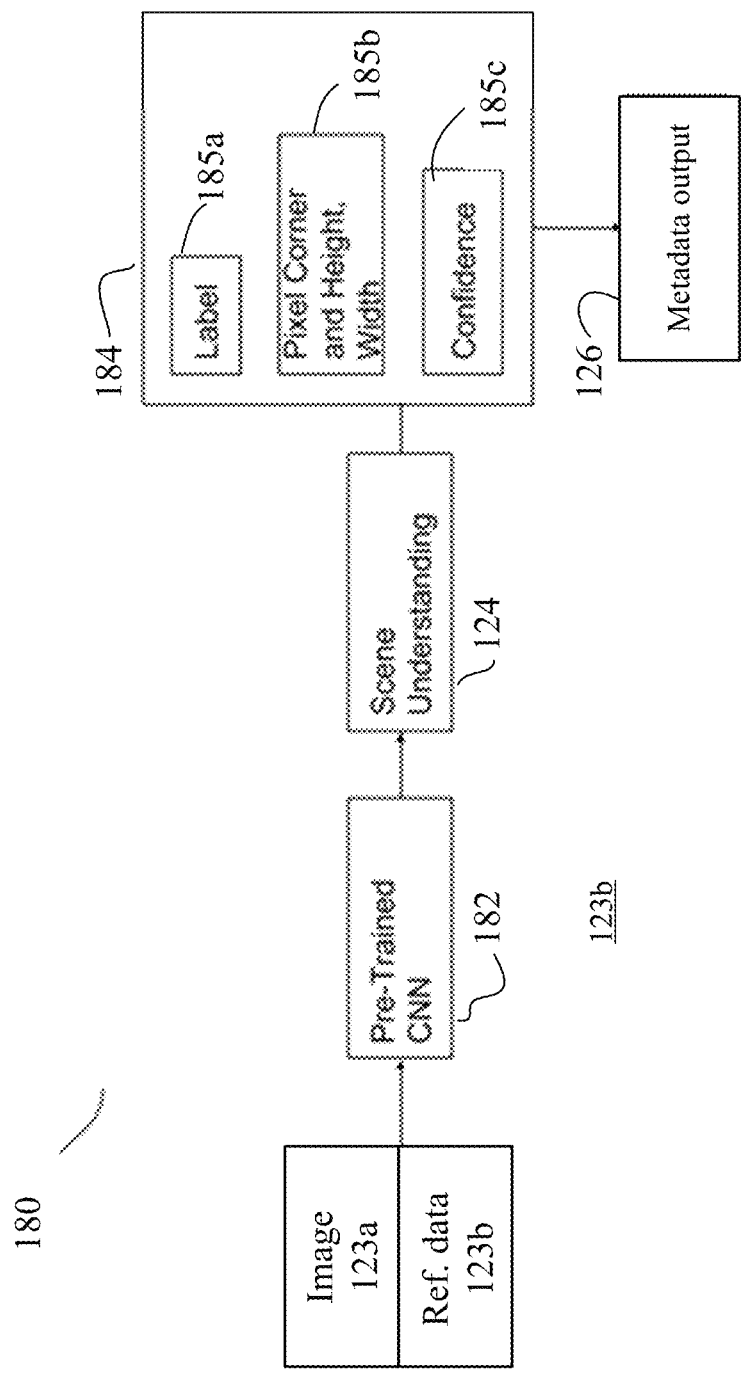
FIG. 5 is a flow diagram for producing instructions for a 3D modeling system to produce 3D models from the output.

Referring now to FIG. 5, a process 180 is executed to derive specific configuration 'instructions' for the 3D modeling engine (FIG. 9) so as to enable the engine to produce 3D models based on the image(s) uploaded. Image 123a (FIG. 5) with reference data 123b are sent to an artificial intelligence (A.I.) process for classification of objects in the image. One example of an A.I. process is a pre-trained convolutional neural network (or "P-CNN") 182 which serves as the accuracy component for image classification during processing by the scene understanding service 124a. Alternatively, an unsupervised neural network could also be used. In other implementations other A.I. processes could be used. In one embodiment, the output of the neural net is the metadata that will be used to produce metadata 'instructions' to input into the 3-dimensional modelling engine (or 2 dimensional representation engine).

Aspects of the CNN implementation will now be described. A CNN or "convolutional neural network" is a type of deep neural network commonly applied to analyzing visual imagery. CNNs are regularized versions of multilayer perceptrons, e.g., fully connected networks where each neuron in one layer is connected to all neurons in a succeeding layer. This characteristic of "full-connectedness" makes CNNs prone to 'overfitting' data. In order to address overfitting, "regularization" of a CNN assembles complex patterns using smaller and simpler patterns.

The transformation service 124 identifies 184 objects within the image scene and applies labels 185*a* (classification). The transformation service 124 extracts each labeled object's region within the image scene by producing a rectangular window around such labeled objects. From this rectangular window the transformation service 124 determines and outputs pixel corner coordinates 185*b*, height and width and confidence values 185*b* that are generated into metadata 126 that includes specific instructions for the 3D modeling engine (FIG. 9) to produce 3D models from the image and the instructions. The transformation service 124 thus is a series of processes comprised of object recognition, semantic segmentation, and object detection, among other processes for recognizing and labeling objects in an image. Object recognition and object detection detect objects in a scene, localize the objects within a bounding box, and applies corresponding classification labels ("label"), to those items that are recognized in a scene. Semantic segmentation classifies each pixel in an image belonging to an object category. For instance, the semantic segmentation breaks up or segments a scene into plural segments according to recognized features and classifies each pixel as belonging to one of the plural segments.

Figure 6:
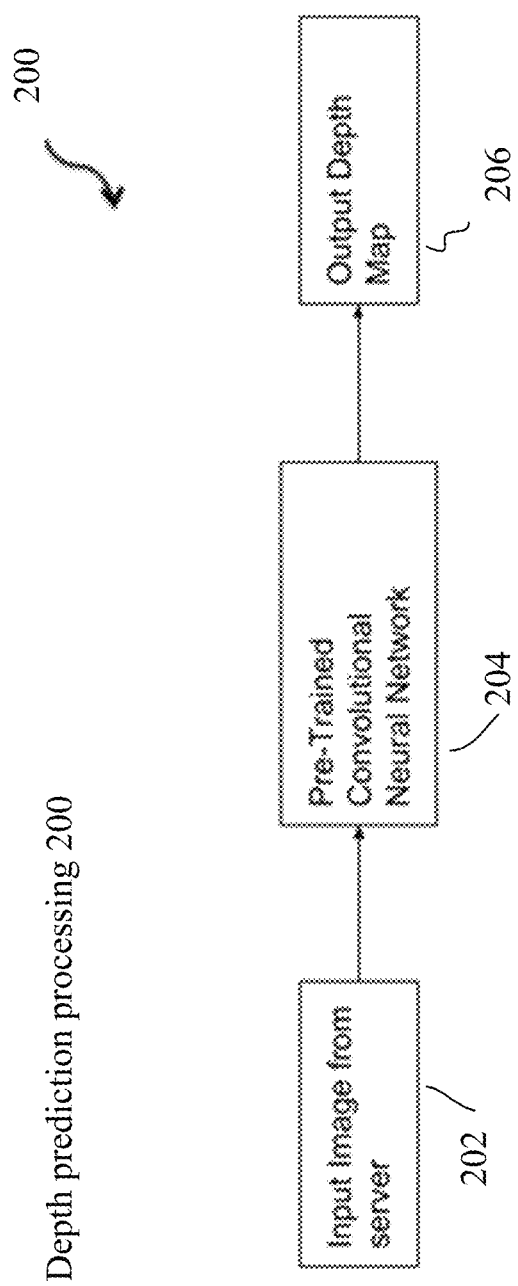
FIG. 6 is a flow diagram for producing a depth map.

Referring now to FIG. 6, depth prediction processing 200 is executed on server 102 (FIG. 4) to derive a depth map 206 from a single image or (plural images) 202. The depth prediction process 200, receives 202 input image (image State 2) from the server 102 that processes the input image through the pre-trained convolutional neural network 204 and outputs the depth map 209.

Figure 7:
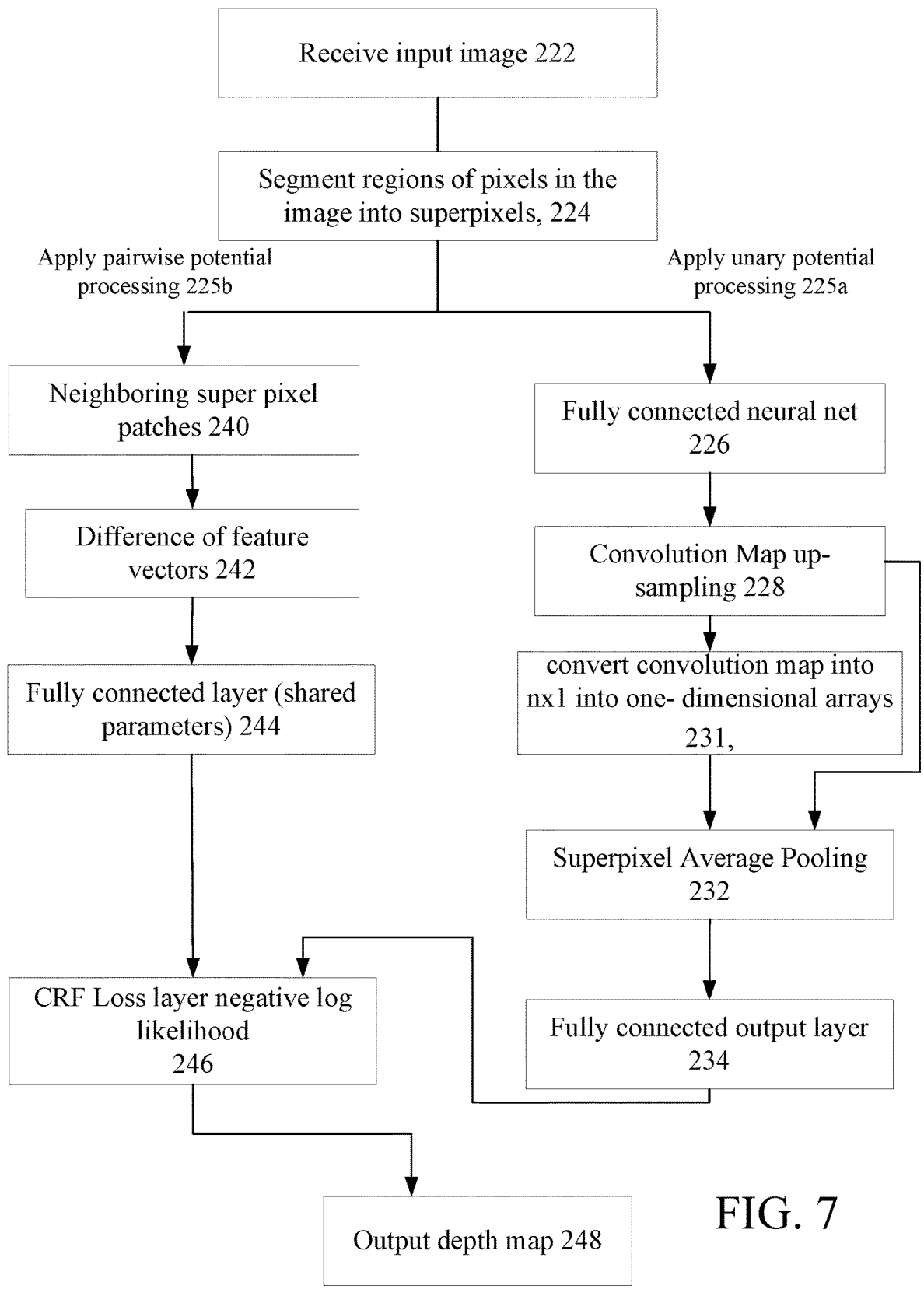
FIG. 7 is a flow diagram for inferring depth on a pixel basis.

Referring now to FIG. 7 depth inference processing 220 is shown. The depth inference processing 220 is executed as a sever process and is used to infer a depth of each pixel in a single image. An input image is transformed by the superpixel segmentation process 224 that combines small homogenous regions of pixels into superpixels (e.g., a conglomerate of small homogenous regions of pixels combined to function as a single input).

To predict depth of an image, an 'energy' (e.g., a penalty) function is determined. This energy function is determined as a combination of unary 225*a* and a pairwise 225*b* potentials over the superpixels. Unary processing 225*a* returns a depth value for a single superpixel while the pairwise processing 225*b* communicates with neighboring superpixels having similar appearance to produce similar depths for those neighboring superpixels. As used herein unary refers to an operation with only one operand, i.e. a single input, in this instance a single superpixel.

The unary potential processing 225*a* for a single superpixel is determined as follows: a superpixel is inputted and fed into a fully convolutional neural net 226 that produces 228 a convolutional map that has been up-sampled (as defined below) to the original image size. The fully convolutional neural net (CNN) as mentioned above, is a conventional machine learning architecture effective in image recognition and classification. While convolutional neural nets are a conventional machine learning architecture solution to those skilled in the art, the production of a superpixel and use as input into a CNN is generally non-conventional. The up-sampling process applies to a data sample (e.g., a pixel in this case) a filter or series of filters to artificially increased the pixel in scale. The output of the convolution map up sampling are H×L matrices (that represent height and length), which are converted into n×1 into one-dimensional arrays 231, e.g., superpixel segmentation.

The up-sampled convolutional map(s) 228 as well as the superpixel segmentation 231 over the original input image are fed into a superpixel average pooling layer 232 where a pooling process is performed for each superpixel region. As used herein "pooling" refers to a down-sampling process where the amount of parameters are down sampled for computational efficiency in the network and controlled "overfitting." The output of the superpixel average pooling layer 232 are feature vectors that are used as input to a fully connected output layer to produce a unary output.

The fully connected output layer (not shown) is a neural input layer in the CNN, typically the last layer, where each neuron in that layer is connected to all neurons in the prior superpixel average pooling. This layer produces the unary output. Thus, the CNN typically takes small features from the image and uses these small features as input to compute and learn different types of regions of the images to classify. In this case, the CNN is taking a superpixel as input.

The pairwise function processing 225*b* for a single superpixel is determined as follows: similar feature vectors are collected from all neighboring superpixel patches (areas of superpixels that are adjacent, e.g., neighbors to the single superpixel). Neighbors of a superpixel those superpixels that are adjacent to, e.g., within a distance value of 1 to n of the single superpixel, where "n" is empirically determined. Unique feature vectors of the superpixel and neighboring superpixel patches such as color histogram, textures, and other feature types 242 are identified and catalogued. The results of these collections of similar and unique features are output that is fed into the fully connected layer (or shared parameters) 244 that outputs a vector of similarities between the neighboring superpixel patches and the single superpixel.

The unary output is fed into the Conditional Random Fields graph model, or "CRF" Loss Layer in order to produce the output depth map 248. The fully connected layer output 244, in conjunction with the unary terms 234, serve as input into the CRF Loss Layer so as to minimize the negative log-likelihood 246 for producing an output depth map 248. CRF is a graph model, familiar to those skilled in the art, used for prediction (i.e. image de-noising); it is used in this description to model relations between neighboring superpixels. The output depth map is an image or image channel that contains information relating to the distance of the surfaces of scene objects from a reference viewpoint.

Figure 8:
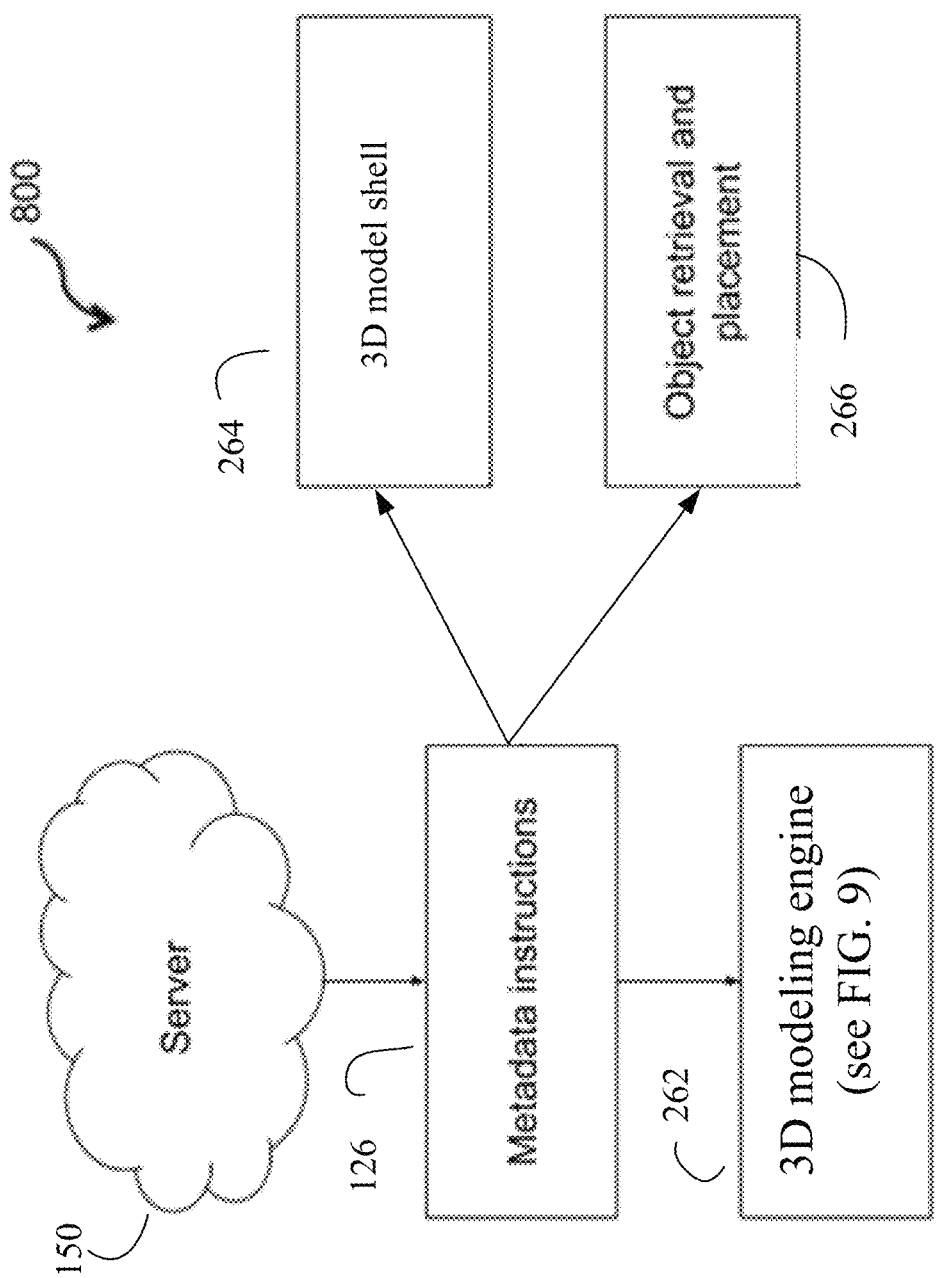
FIG. 8 is a flow diagram for inferring interior boundaries of items appearing in the one or more images.

Referring now to FIG. 8 a process 260 is executed as a server process to derive interior boundaries of a 3D model. For example, such interior boundaries can include the walls, floor and ceiling (the spatial structural shell or "shell"), of an image useful in 3D object retrieval and placement in 3D world coordinate space). "World Coordinate" space is a universal coordinate system in 3D computer graphics used for positioning 3D objects. The server 102 passes 262 the metadata 126 to the 3D modeling engine 128 (see FIG. 9 for exemplary aspects of such an engine). Output resulting from the metadata are a 3D model shell 264 and the 3D object retrieval from the server 102; and placement in 3D world coordinate space 266.

Metadata 126 are a compilation of input data for the 3D modeling engine 128 to produce the foregoing outputs. The compilation of the metadata 126 includes, by way of example, data such as a Uniform Resource Locator ("URL"), i.e., a link to the output depth map and the file path to the original image uploaded by the user; a URL link to relevant 3D objects on the server 102 and the average depth or placement of the 3D objects measured in pixels, which are converted into 3D World Coordinates, object labels, the "confidence" or degree of accuracy values 185 calculated by the computer regarding the degree of confidence in the classification and labeling of a scene object, and, the height and width of a bounding window in which the labeled object is located within a scene.

Metadata example—illustrative data structure representation.

| URL to Output Depth map | | object | Calculated Confidence Value, e.g., | height of | width of | file path to original image uploaded by user |
|---|---|---|---|---|---|---|
| Object URL link | average depth (pixels) | label (semantic label) | a numeric or percent value | bounding window (pixels) | bounding window (pixels) | |
| 1 | | | | | | |
| 2 | | | | | | |
| * | * | * | * | * | * | * |
| * | * | * | * | * | * | * |
| * | * | * | * | * | * | * |
| n | | | | | | |

Pseudo-code examples for metadata sets are set out below. The metadata contains a URL link to the depth map computed by the service 10 and the file path to the original image uploaded by the user.

The objects_data field contains the URL of the 3d object on the server, the average depth or placement of that object in pixels, which is then converted into 3d world coordinates.

"Bottom_Left" is the origin of the 3d object; "classification" is the object label, "confidence" is a measure of the degree of accuracy with which the computer vision algorithm has classified an object; and, "height" and "width" refer to the window size of the classified object in an uploaded image.

The metadata file 126 in Example 1 below contains:

```
image data "img_data": {
depth data "depth_data": null,
depth data file name "depth_filepath": "306-depth.png",
a file path "filepath": "306.png",
a picture id "picture_id": 306,
reference units "reference_units": "inches",
and for objects
semantic data
depth image;
coordinates;
labels;
confidence values;
object location values
```

Consider the item "chair". The file has the location of the structure "address": "https://hostalabs.com", its "ave_depth" as "2.811230421066284," inches location as "bottom_left": with World coordinates [82, 368], a color "color name": "dimgray", a confidence value "confidence": 0.9925103187561035, which corresponds to the confidence in the classification of and determined parameters of the item the item's "est_height", as "23.339647726281814," inches and a "pixel_height" as 148, and "pixel_width" as 56, and a color palette "rgb color". [139, 112, 93] values.

EXAMPLE 1

```
{
"img_data": {
"depth_data": null,
"depth_filepath": "306-depth.png",
"filepath": "306.png",
"picture_id": 306,
"reference_units": "inches",
"semantic_data": {
"bed": [
{
"address": "https://hostalabs.com",
"ave_depth": 2.7333521842956543,
"bottom_left": [
207,
396
],
"color name": "silver",
"confidence": 0.8699102401733398,
"est_height": 35.22271524362479,
"pixel_height": 234,
"pixel_width": 318,
"rgb color": [
191,
192,
190
]
}
],
"chair": [
{
"address": "https://hostalabs.com",
"ave_depth": 2.811230421066284,
"bottom_left": [
82,
368
],
"color name": "dimgray",
"confidence": 0.9925103187561035,
"est_height": 23.339647726281814,
"pixel_height": 148,
"pixel_width": 56,
"rgb color": [
139,
112,
93
]
}
],
"house": [
{
"ave_depth": 3.2572555541992188,
"bottom_left": [
5,
412
],
"color name": "darkgray",
"confidence": 0.8631517887115479,
"est_height": 53.081768782844975,
"pixel_height": 405,
"pixel_width": 545,
"rgb color": [
168,
163,
146
]
}
],
"microwave": [
{
"address": "https://hostalabs.com",
"ave_depth": 4.044846534729004,
"bottom_left": [
76,
217
],
"color name": "darkgray",
"confidence": 0.9977370500564575,
"est_height": 16.444784844696372,
"pixel_height": 40,
```

EXAMPLE 1
```
            "pixel_width": 61,
            "rgb color": [
              150,
              159,
              168
            ]
          }
        ],
        "tv": [
          {
            "address": "https://hostalabs.com",
            "ave_depth": 1.3527330160140991,
            "bottom_left": [
              0,
              305
            ],
            "color name": "black",
            "confidence": 0.9985752105712891,
            "est_height": 33.44170615321548,
            "pixel_height": 157,
            "pixel_width": 48,
            "rgb color": [
              36,
              34,
              28
            ]
          }
        ]
      },
      "user": "samp_user",
      "wall_data": {
        "number_of_points": 5,
        "points": [
          [
            53,
            6,
            3.1678709983825684
          ],
          [
            134,
            59,
            4.941289901733398
          ],
          [
            148,
            69,
            5.741237640380859
          ],
          [
            167,
            67,
            5.656834602355957
          ],
          [
            504,
            38,
            2.6623311042785645
          ]
        ]
      }
    }
  }
}
```

EXAMPLE 2
```
"address": "https://dl.dropbox.com/s/q9xvoca4kybeop0/sink2.obj?dl=0",
    "ave_depth": 49.61813186813187,
    "bottom_left": [
      192,
      224
    ],
    "classification": "sink",
    "confidence": 0.1300784796476364,
    "height": 14,
```

EXAMPLE 2
```
    "width": 78
  },
  {
    "address": "https://dl.dropbox.com/s/n5fhe9gl8dd04xl/bottle.obj?dl=0",
    "ave_depth": 144.66666666666666,
    "bottom_left": [
      169,
      139
    ],
    "classification": "bottle",
    "confidence": 0.21171382069587708,
    "height": 21,
    "width": 9
  },
  {
    "address": null,
    "ave_depth": 81.10242914979757,
    "bottom_left": [
      181,
      307
    ],
    {
"img_data": {
  "depth_image": "http://ec2-52-91-230-86.compute-1.amazonaws.com/instance/29-depth.png",
  "filepath": "29.png",
  "objects_data": [
    {
      "address": "https://dl.dropbox.com/s/ii5pren6gpz1n6p/glasscup.obj?dl=0",
      "ave_depth": 111.14193548387097,
      "bottom_left": [
        240,
        400
      ],
      "classification": "cup",
      "confidence": 0.18342258036136627,
      "height": 20,
      "width": 31
    },
    {
```

Figure 9:
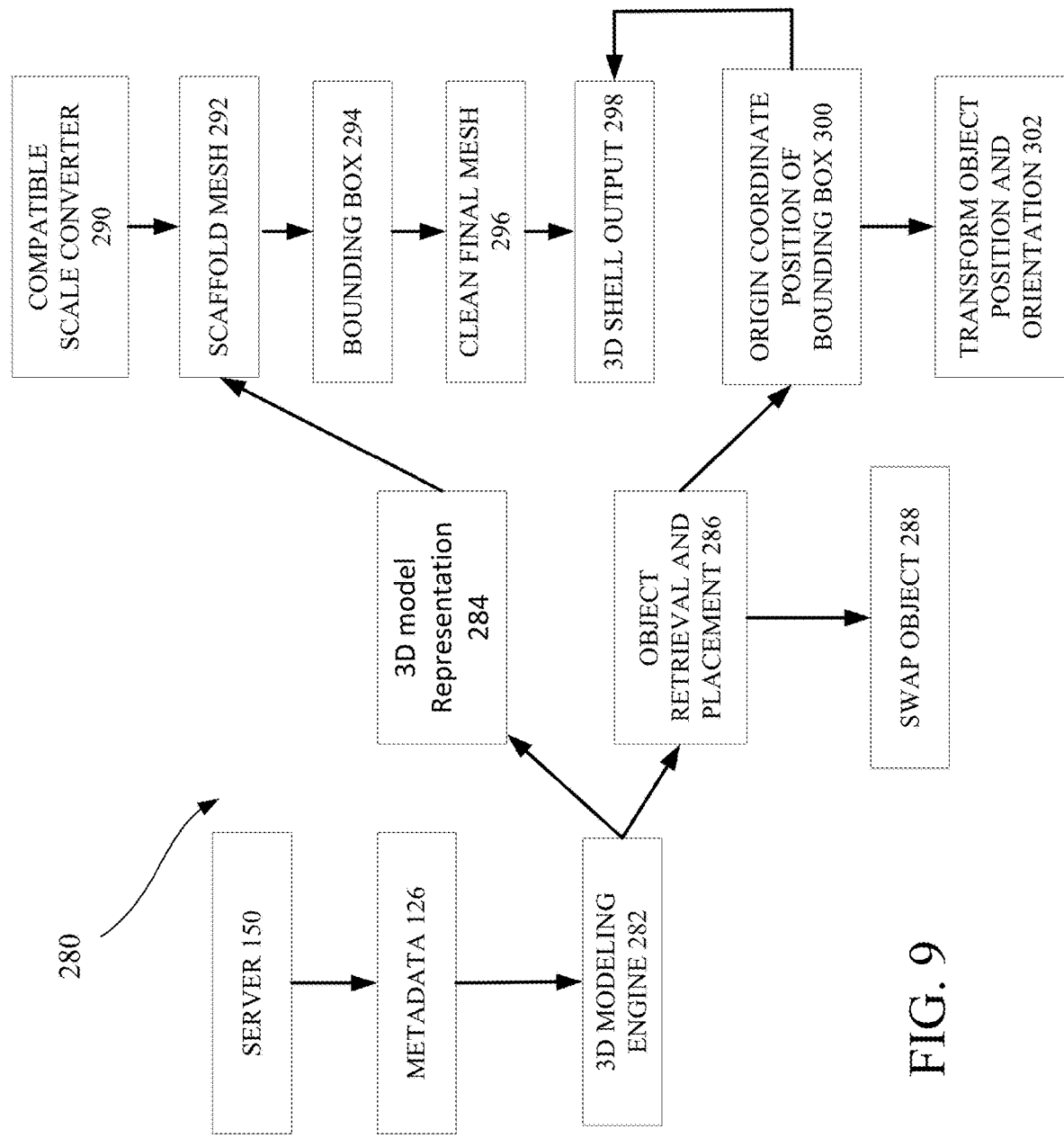
FIG. 9 is a flow diagram for deriving a 3D model from the image.

Referring now to FIG. 9, a process 280 executed to derive a 3D model from the uploaded image is shown. The server 102 produces the metadata file 126 that contains:
1) the Depth Image;
2) coordinates;
3) labels;
4) confidence values; and,
5) object location.

The server provides the metadata file data to a 3D modeling engine (3D engine) 282. The 3D engine 282 uses the metadata 126 to produce a 3D model representation, e.g., Shell, of the interior space 284 as well as retrieve 3D objects from the server 102 for placement 288 into three-dimensional space, where such objects contain an option to swap object prototypes 288.

To produce the geometric shell of an interior space 284, a compatible scale convert is used to perform an image conversion 290 to produce depth values that the 3D engine system can interpret. The depth values are used to extrude the depth image into a volumetric mesh that serves as a scaffold mesh 294 for a final mesh 296. The scaffold mesh 294 is used to calculate a bounding box 294 around itself that will be used to generate the clean final mesh 296 that becomes the 3D shell output 298.

To place 3D representative items in the interior shell, a system for 3D object retrieval and placement instructions 286 is produced for the 3D modeling engine 282. Each 3D object contains a coordinate point defined as its origin position as Start X and Start Y 300 for transfer to a destined (transformed) position and orientation in 3D coordinate space 302. The foregoing data is provided by the metadata 126 that contain the calculated average-depth-pixel-and-size-factor conversions for scaling the model proportionally.

Figure 10:
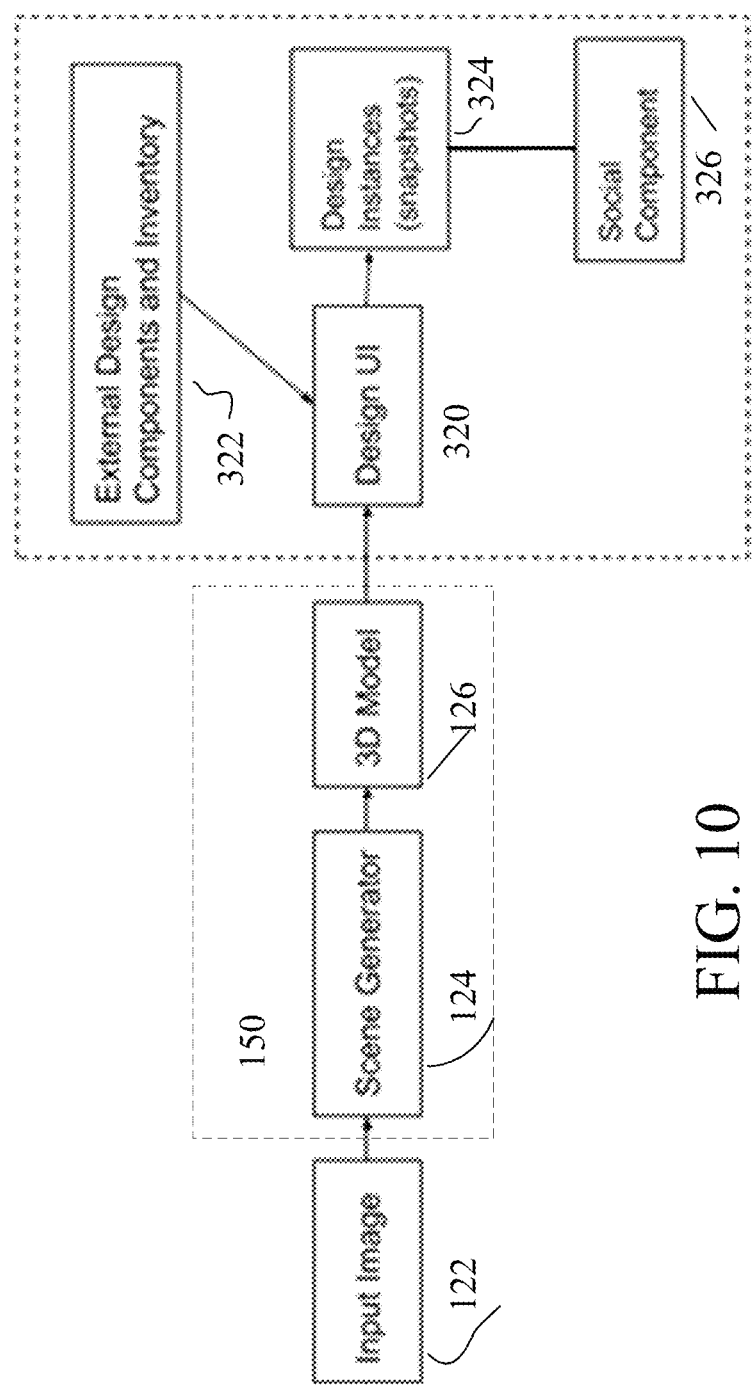
FIG. 10 is a flow diagram depicting image additions.

Referring to FIG. 10, a number of approaches or techniques can be used to provision the process 102 (FIG. 2). A user inputs, via device 102 (FIG. 1) a single image for the image preprocessing 122, and the pre-processed image is subsequently processed by the scene generator 124 to derive an interactive 3D model 126 from that image.

The user submits the preprocessed image (or the image) to the server 102 (FIG. 4). In some implementations, the server 102 is a local server process that executes on a user device. In other implementations, the server 102 is a remote server process and system that is accessed via a network, e.g., a local network or the Internet. In the example of the Internet, the server 102 can be supplied as a service to customers.

The input image is processed by the scene generator 124 that outputs the 3D model from 3D modeling engine 126. An output file including the 3D model can be used to input into a design UI system 320 where external design components and inventory 322 are integrated into the design UI system. The state (or snapshot) 324 of each design change can be kept on the server 102 and social components 326 can also be integrated into the system.

Figure 11A:
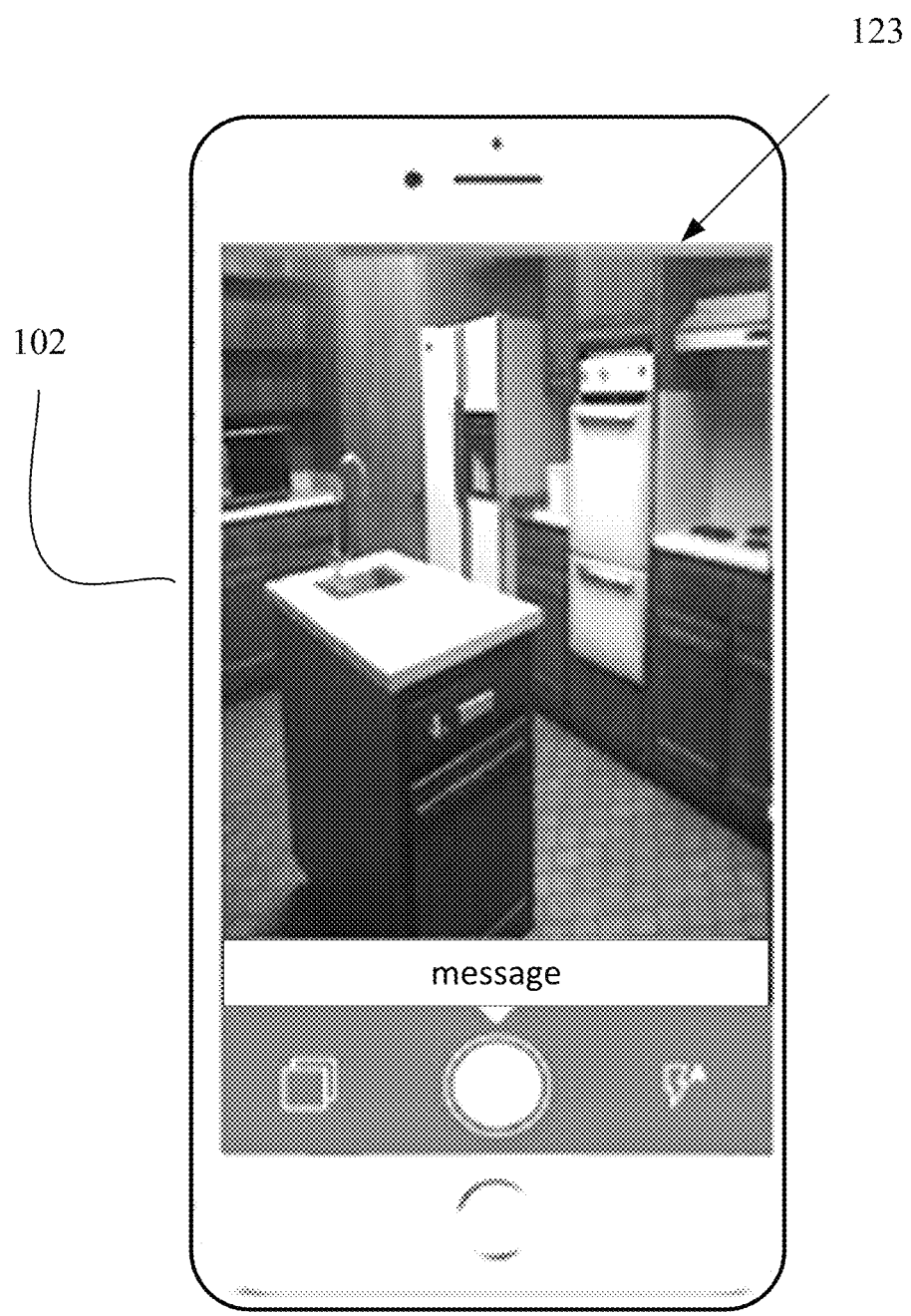
FIGS. 11A-C are diagrams depicting processing results at various stages.
Figure 11B:
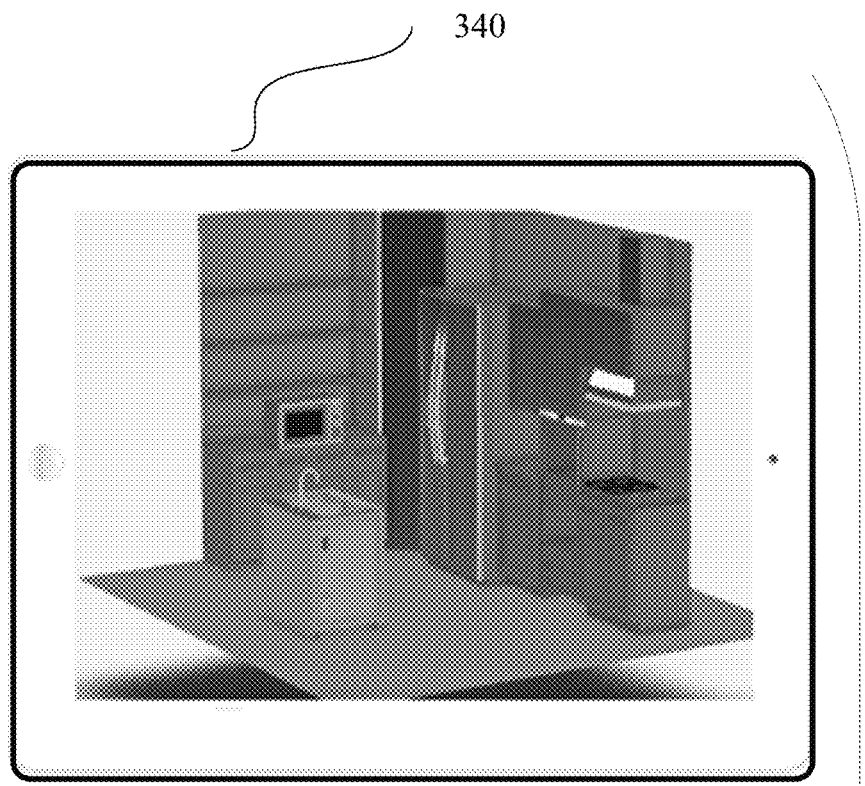
Figure 11B:
Figure 11C:
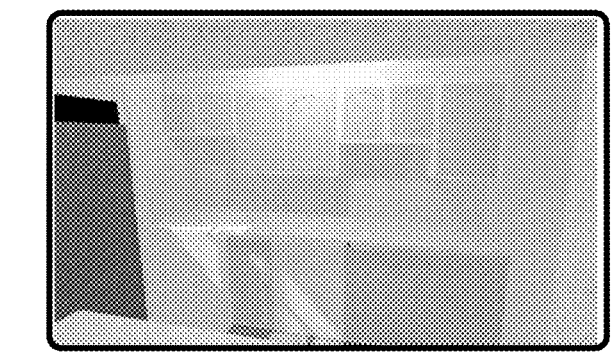
Figure 11C:
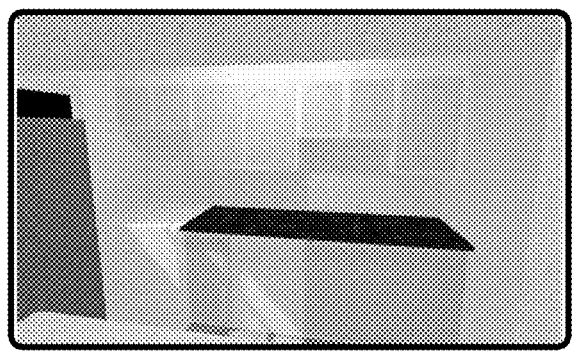
Figure 11C:
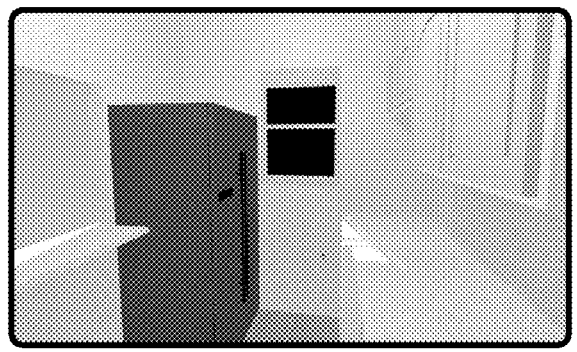
Figure 11C:
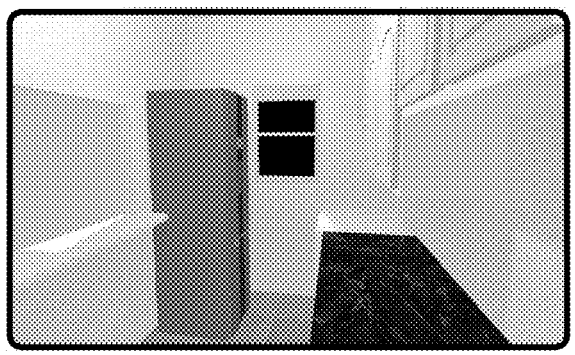

Referring now to FIG. 11*a* shows the application on mobile device 102, e.g., a smartphone, enabled to capture a photograph 123 of an existing space. FIG. 11*b* shows the application on the mobile device 102, where the photo in FIG. 11*a* has been first translated into a 3D model 340 using the system and then processed into a photorealistic rendering 3402 using the application. FIG. 11*c* shows 344 the application's ability to select new components, furniture, and appliances from within the 3D model generated by the system.

Figure 12:
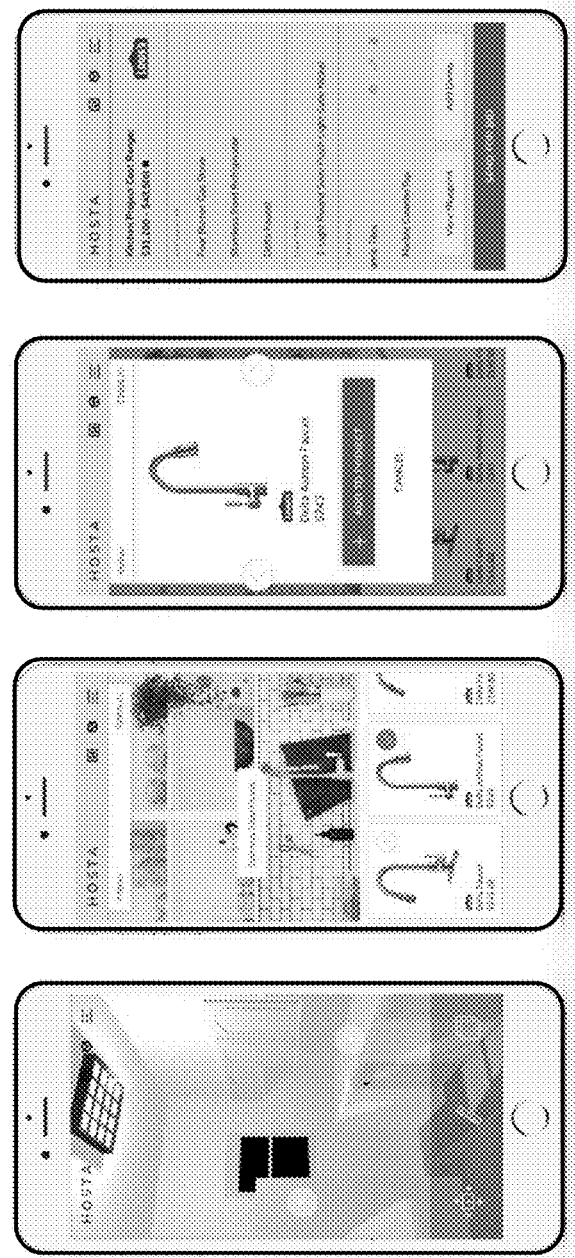
FIG. 12, views A-D are diagrams depicting views of the 3D model with depicted items derived from on-line searches
Figure 12:
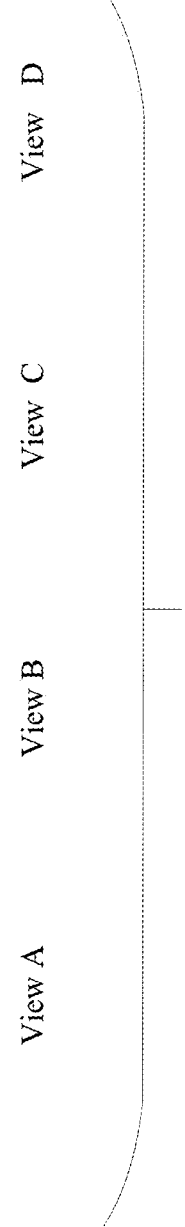

Referring now to FIG. 12, shows the application with the 3D model generated by the system (view A) with the ability to pull a catalog of purchase items from retail vendors (view B), add the selected purchase item into the 3d model (view C), and obtain a budget list of selected purchase items (view D).

Referring now to FIGS. 13A-13D, these figures show the device 102 with a picture of an interior space (FIG. 13A) generated into a 3D model (FIG. 13B). The 3d model shows a view (FIG. 13C) and shows a view that contains an interactive hotspot (FIG. 13D) on a potential purchase item (insert shown in FIG. 13D), upon clicking the hotspot, the user is presented with an external catalog item (not shown).

Figure 14:
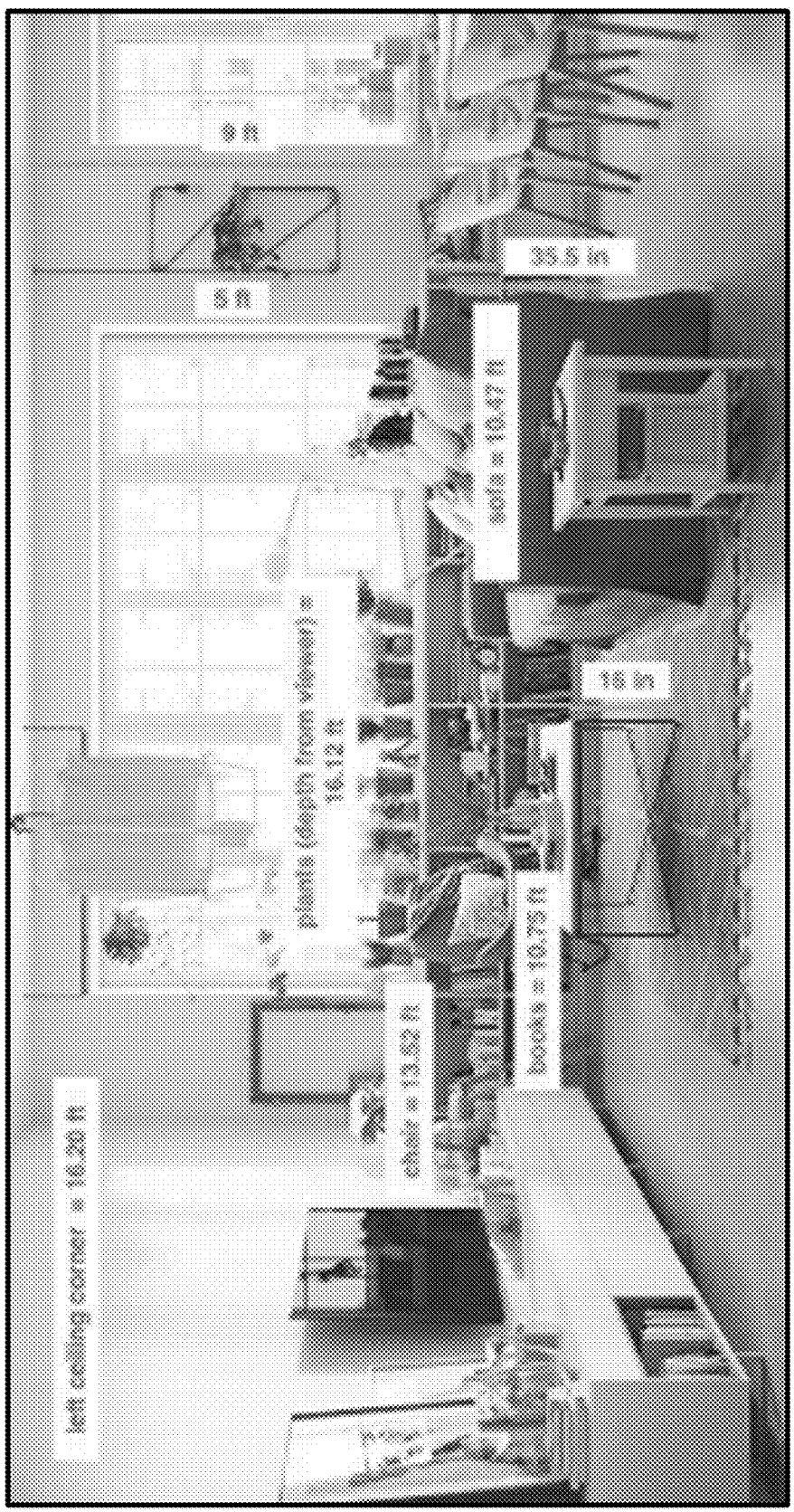
FIG. 14 is a depiction of a scene with labels.

Referring now to FIG. 14, a 2D photographic view representation of a scene having items obtained from the metadata instructions, e.g., labels such as an image, floor plan, section, and/or elevation overlaid on the two dimensional image of the depicted scene are shown. An alternate output is of object information and measurement information. Another alternative output includes an insertion of virtual objects as retrieved from a source into the photographic view, as well as other forms of a 2D representation.

Figure 15:
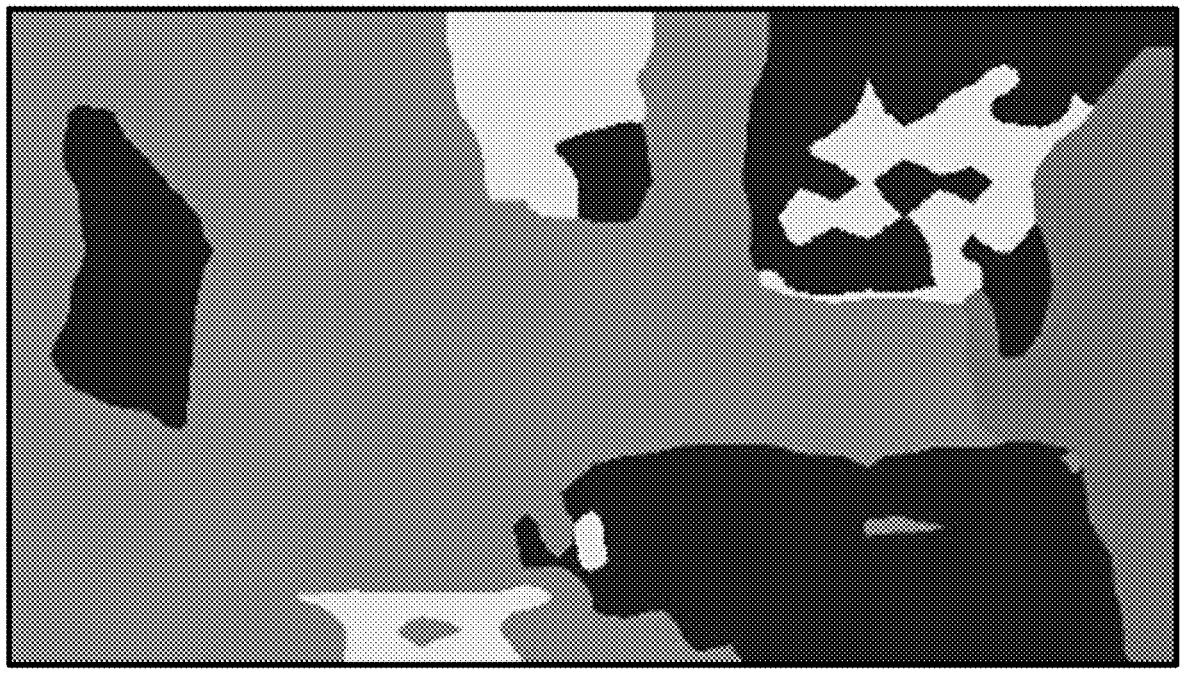
FIG. 15 is a depiction of a segmentation.

Referring now to FIG. 15, a segmented image is shown having regions that isolate architectural properties of a scene as captured in the image, such properties including ceiling, floor, wall.

Figure 16:
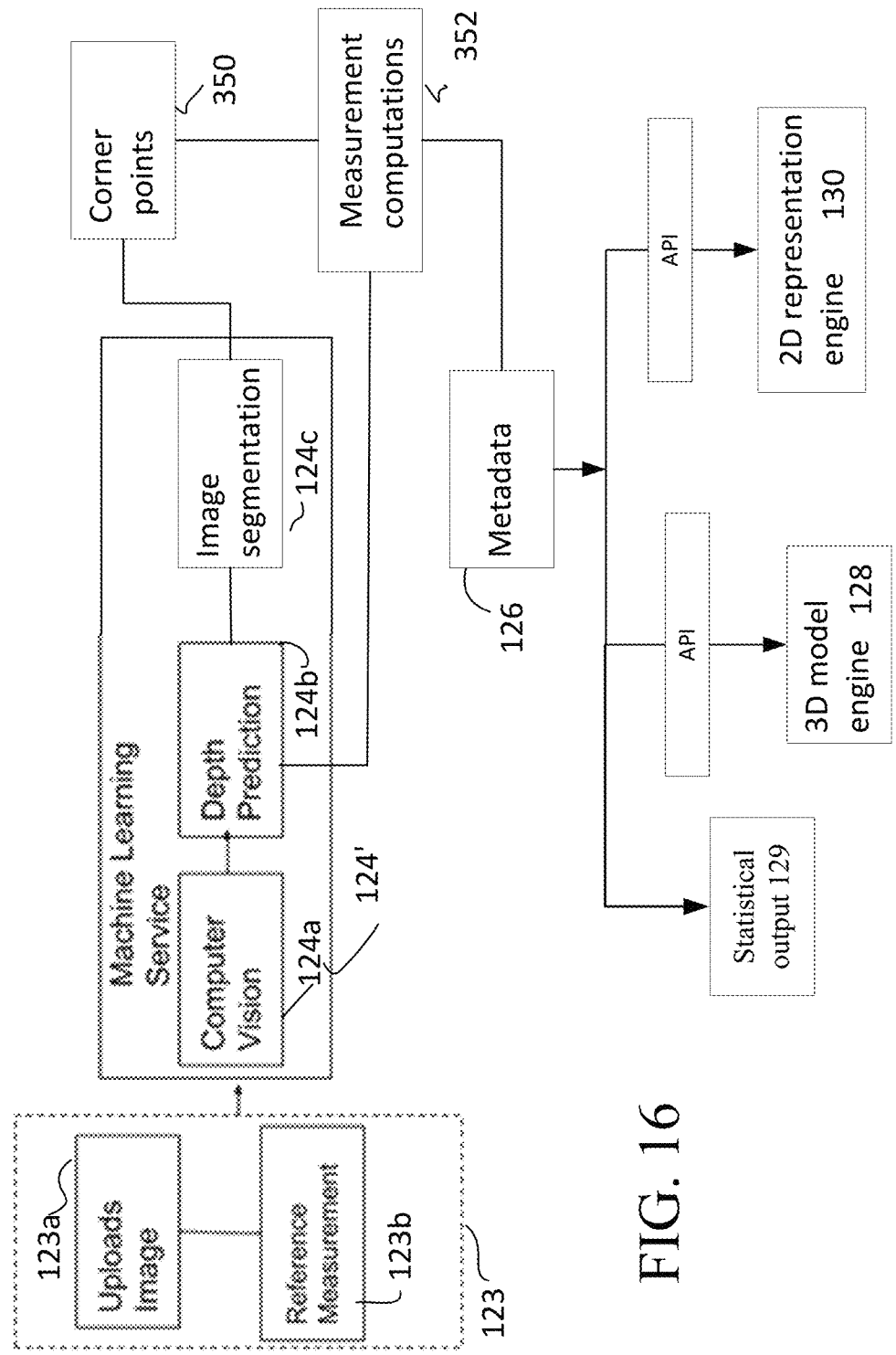
FIG. 16 is a block diagram of an alternative process.

Referring now to FIG. 16, an alternative 120' to the process 120 (FIG. 2) is shown and executes to translate one or more uploaded images having reference measurements into a scaled 3D model and/or 2D representation output. The features and descriptions of FIG. 2 generally are applicable here as in FIG. 2. A user with a user device 102 uploads an image 123*a* with reference measurement data 123*b*. The reference measurement data can be provided in a number of ways, as discussed in FIG. 2. The process 120' included the machine learning service 124' that includes image segmentation 124*c*.

The uploaded image 123*a* with reference measurement(s) 123*b* are input to the transformation service 124'. The components of the transformation service 124' sub-system components scene understanding service 124*a*, a depth prediction sub-system component 124*b* and image segmentation 124*c*. Data from the image segmentation 124*c* component are used in corner point computations 350. Data from the depth prediction component 124*b* and corner point computations 350 are used with measurement computations 352 to produce computed measurement data from which the metadata 126 is produced. The metadata are input, via an API or formatter into the 3D engine 128 to produce an output 3D model (not shown) or the metadata are input, via an API or formatter into the 2D engine 130 to produce a 2D representation output (not shown), such as an image, floor plan, elevation, and/or section views. In addition, or alternatively, the metadata can be analyzed to produce statistical output 129.

Memory stores program instructions and data used by the processor of the system. The memory may be a suitable combination of random access memory and read-only memory, and may host suitable program instructions (e.g. firmware or operating software), and configuration and operating data and may be organized as a file system or otherwise. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Servers may include one or more processing devices (e.g., microprocessors), a network interface and a memory (all not illustrated). The server may physically take the form of a rack mounted card and may be in communication with one or more operator devices. The processor of each server acts as a controller and is in communication with, and controls overall operation, of each server. The processor may include, or be in communication with, the memory that stores processor executable instructions controlling the overall operation of the server. Software may include a suitable Internet protocol UP) stack and applications/clients.

Each server may be associated with an IP address and port(s) by which it communicates with the user devices to handle off loaded processing. The servers may be computers, thin-clients, or the like.

All or part of the processes described herein and their various modifications (hereinafter referred to as "the processes") can be implemented, at least in part, via a computer program product, i.e., a computer program tangibly embodied in one or more tangible, non-transitory physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, described herein without adversely affecting their operation. Furthermore, various separate elements may be combined into one or more individual elements to perform the functions described herein.

Other implementations not specifically described herein are also within the scope of the following claims.

What is claimed is:

1. A system comprising:
a computing device that includes a processor, memory and storage that stores a computer program that comprises instructions to configure the computing device to:
receive one or more two-dimensional digital images of a scene, each of the one or more two-dimensional digital images including plural pixels;
transform the received plural pixels of each of the one or more, two-dimensional digital images into superpixels that are combinations of the plural pixels that function as single inputs;
produce metadata that includes depth prediction data for at least some of the plural pixels in the one or more two-dimensional digital images;
produce metadata instructions for controlling a three-dimensional computer modeling engine;
apply the metadata that includes a spatial shell and placed objects corresponding to objects in the one or more two-dimensional digital images, with the placed objects being placeholders that are swapped for three-dimensional representations;
receive reference measurements of two-dimensional objects depicted in the one or more two-dimensional digital images;
produce a volumetric mesh that serves as a scaffold mesh for a final mesh, with the scaffold mesh used to calculate one or more bounding boxes;
calculate original coordinate positions of the one or more bounding boxes;
translate placed object positions and orientations based on the placed objects, the reference measurements, and a scaling;
place the placed objects into the spatial shell; and
output the metadata to the three-dimensional computer modeling engine to produce a three-dimensional digital computer model of the scene including the two-dimensional objects depicted in the one or more two-dimensional digital images.

2. The system of claim 1 wherein the system further comprises instructions to configure the computing device to:
store the reference measurements and reference objects in a database server.

3. The system of claim 1 wherein the metadata contains image processed specific and referenced information.

4. The system of claim 1 wherein the system further comprises instructions to configure the computing device to:
apply depth prediction processing to depth values to extrude a depth image of the depth values into the volumetric mesh that serves as the scaffold mesh for the final mesh.

5. The system of claim 1 wherein the placed objects include properties of the placed objects.

6. The system of claim 1 wherein the system further comprises instructions to configure the computing device to:
swap the placed objects for the three-dimensional representations placed into the spatial shell.

7. The system of claim 1 wherein the system further comprises instructions to configure the computing device to:
semantically segment pixels in the one or more two-dimensional images as belonging to an object category, segmenting a scene into plural segments according to recognized features;
classify pixels as belonging to one of the plural segments, with the segmented image having regions that isolate architectural properties of the scene as captured in an image.

8. The system of claim 1 wherein the metadata instructions include one or more of floor plan, section, elevation drawings, object information, and measurement information.

9. The system of claim 1 wherein the system further comprises instructions to configure the computing device to:
pull a catalog of purchase items from vendors; and
add selected purchase items into the three-dimensional model.

10. A system comprising:
a computing device that includes a processor, memory and storage that stores a computer program that comprises instructions to configure the computing device to:
receive by a transformation engine, one or more two-dimensional digital images of a scene, the one or more two-dimensional digital images including plural pixels and image data;
transform the received plural pixels into superpixels that are combined to function as a single input;
produce from the one or more two-dimensional digital images, metadata that includes depth prediction data for at least some of the plural pixels in the one or more two-dimensional digital images and that produces metadata for controlling a three-dimensional computer modeling engine;
apply the metadata that includes a three-dimensional computer modeling shell and placed objects that are placed in the one or more two-dimensional image, with the placed objects being placeholders that are swapped for three-dimensional representations;
produce a volumetric mesh that serves as a scaffold mesh for a final mesh, with the scaffold mesh used to calculate one or more bounding boxes;
calculate original coordinate positions of the one or more bounding boxes;
place the placed objects into the three-dimensional computer modeling shell;
receive reference measurements of two-dimensional objects depicted in the one or more two-dimensional digital image;
translate placed object positions, orientations and sizing based on the original coordinate positions, the two-dimensional objects, the reference measurements, and a scaling; and
output the metadata to the three-dimensional computer modeling engine to produce a three-dimensional digital computer model of the scene including the two-dimensional objects depicted in each of the one or more two-dimensional digital images.

11. The system of claim 10 wherein the system further comprises instructions to configure the computing device to:
store the reference measurements and placed objects in a database server.

12. The system of claim 10 wherein the metadata contains image processed specific and referenced information.

13. The system of claim 10 wherein the system further comprises instructions to configure the computing device to:
apply depth prediction processing to depth values to extrude a depth image of the depth values into the volumetric mesh that serves as the scaffold mesh for the final mesh.

14. The system of claim 10 wherein the placed objects include properties of the placed objects.

15. The system of claim 10 wherein the system further comprises instructions to configure the computing device to:
swap the placed objects for the three-dimensional representations placed into the three-dimensional computer modeling shell.

16. The system of claim 10 wherein the system further comprises instructions to configure the computing device to:
semantically segment pixels in the one or more two-dimensional images as belonging to an object category, segmenting a scene into plural segments according to recognized features;
classify pixels as belonging to one of the plural segments, with the segmented image having regions that isolate architectural properties of the scene as captured in an image.

17. The system of claim 10 wherein the metadata includes one or more of a floor plan, a section, elevation drawings, object information, and measurement information.

18. The system of claim 10 wherein the system further comprises instructions to configure the computing device to:
pull a catalog of purchase items from retail vendors; and
add selected purchase items into the three-dimensional model.

19. A method of inserting 3D objects into a spatial 3-dimensional model comprises
producing from metadata a spatial shell to place objects from one or more two-dimensional digital images, with the placed objects being placeholders that are swapped for three-dimensional representations;
producing a volumetric mesh that serves as a scaffold mesh for a final mesh, with the scaffold mesh used to calculate one or more bounding boxes;
calculating original coordinate positions of the one or more bounding boxes;
placing the placed objects into the spatial shell;
receiving reference measurements of two-dimensional objects depicted in the one or more two-dimensional digital images;
translating the placed object positions, orientations and sizing based on the original coordinate positions, the two-dimensional objects, the reference measurements, and a scaling; and
outputting the metadata to a three-dimensional computer modeling engine to produce a three-dimensional digital computer model of a scene including the two-dimensional objects depicted in the one or more two-dimensional digital images.

20. The method of claim 19 further comprising:
storing the reference measurements and placed objects in a database server.

21. The method of claim 19 wherein the metadata contains image processed specific and referenced information.

22. The method of claim 19 further comprising:
applying depth prediction processing to depth values to extrude a depth image of the depth values into the volumetric mesh that serves as the scaffold mesh for the final mesh.

23. The method of claim 19 wherein the placed objects include properties of the placed objects.

24. The method of claim 19 further comprising:
swapping the placed objects for the three-dimensional representations placed into the spatial shell.

25. The method of claim 19 further comprising:
semantically segmenting pixels in the one or more two-dimensional images as belonging to an object category, segmenting a scene into plural segments according to recognized features;
classifying pixels as belonging to one of the plural segments, with the segmented image having regions that isolate architectural properties of the scene as captured in an image.

26. The method of claim 19 wherein the metadata includes at one or more of a floor plan, a section, elevation drawings, object information, and measurement information.

27. The method of claim 19 further comprising:
pulling a catalog of purchase items from vendors; and
adding selected purchase items into the three-dimensional model.

28. A method of scaling, comprises:
receiving by a transformation engine, one or more two-dimensional digital images of a scene, the one or more two-dimensional digital images including plural pixels and image data;
produce from the one or more two-dimensional digital images, metadata that includes depth prediction data for at least some of the plural pixels in the one or more two-dimensional digital images;
apply the metadata that includes a three-dimensional computer modeling shell and placed objects being placeholders that are swapped for three-dimensional representations;
produce a volumetric mesh that serves as a scaffold mesh for a final mesh, with the scaffold mesh used to calculate one or more bounding boxes;
calculate original coordinate positions of the one or more bounding boxes;
place the placed objects into the three-dimensional computer modeling shell;
receive reference measurements of two-dimensional objects depicted in the one or more two-dimensional digital images to scale the two-dimensional objects depicted in the one or more two-dimensional digital images; and
scaling placed object positions, orientations and sizing based on the original coordinate positions, the two-dimensional objects, and the reference measurements.

29. The method of claim 28 further comprises:
transforming the received plural pixels into superpixels that are combined to function as single inputs for at least some of the plural pixels.

* * * * *